June 2, 1964   W. G. PFLUGRAD   3,135,038
DEFLECTOR FOR FORMING COILS OF STRAND
Filed March 26, 1962   2 Sheets-Sheet 1

INVENTOR.
W. G. PFLUGRAD
BY Don P. Bush
ATTORNEY

June 2, 1964  W. G. PFLUGRAD  3,135,038
DEFLECTOR FOR FORMING COILS OF STRAND
Filed March 26, 1962  2 Sheets-Sheet 2

INVENTOR.
W. G. PFLUGRAD
BY Don P. Bush
ATTORNEY

United States Patent Office 3,135,038
Patented June 2, 1964

3,135,038
DEFLECTOR FOR FORMING COILS OF STRAND
William G. Pflugrad, Rosedale, Md., assignor to Western Electric Company, Incorporated, New York, N.Y., a corporation of New York
Filed Mar. 26, 1962, Ser. No. 182,583
9 Claims. (Cl. 28—21)

The present invention relates to apparatus for forming a continuously advancing indefinite length of flexible strand material into a series of loops and more particularly, although not exclusively, to apparatus for forming a series of loops in a continuously advancing indefinite length of flexible strand material and distributing the series of loops of flexible strand material into a container such as a rotatable open-topped take-up barrel.

In the manufacture of various types of conductors for the communications industry, it is usually necessary to perform a succession of manufacturing operations involving running lengths of strand material of one type or another. Between most of the several manufacturing operations, a relatively long length of the strand, produced in one operation, is taken up, for example, by winding the strand on a take-up reel or by distributing the strand loosely into an open-topped take-up receiver, such as a barrel. The take-up reel or barrel supporting the strand is then transported to another location and the strand is withdrawn therefrom and supplied to a subsequent strand-processing operation.

In many applications, the strand is of a flexible or resilient nature, an example of which is a flexible type of insulated conductor known as tinsel conductor. Tinsel conductors are used, for example, as the individual conductive units within telephone cords, particularly in the spring cords of modern telephone handsets. The tinsel conductor may include a central conductive unit consisting of four ribbons of tinsel conductors wrapped spirally around a central textile or fiber thread, such as cotton or nylon, thus forming a highly flexible conductive core. A cotton or nylon barrier is then knitted over the conductive core and, finally, a plastic material, such as polyvinyl chloride, is extruded about the knitted barrier to form an insulated, tinsel conductor. Depending on the structure of the conductor or the type of insulating used, the strand may be more resilient or possess different properties which will affect the manner in which the strand is taken up and the type of take-up used.

It is hereby proposed to take up strand material, particularly flexible strands, such as the tinsel conductors just described, in the form of loosely packed loops in rotating take-up barrels. Preferably, the barrels have relatively large volumes so as to hold relatively long lengths of the strand emerging from one operation for ultimate conveyance to a subsequent strand-processing operation, where the strand accumulated in the barrel may be withdrawn. This form of barrel take-up is simpler and more convenient to use than a conventional take-up reel, and is to be used in most cases where a flexible strand is involved.

The barrel take-up herein proposed obviates or simplifies most of the problems just mentioned and results in an economical and easy-to-operate take-up system. The barrel is designed to rotate at a relatively slow speed compared to that of the strand or that which would be required for a take-up reel, thus enabling convenient take-up of strands having speeds up to at least 3000 feet per minute. Further, the barrel rotates at either a constant speed throughout or, preferably, at either of a small number, such as two, constant speeds. In contrast with this, the peripheral speed of the winding surface of a take-up reel must be substantially equal to the wire speed and the rotational speed must be slowed throughout the take-up operation as the winding surface of the reel builds up with the strand.

Also, the barrel take-up described herein requires no traversing distributor, but only a deflector which may either be stationary or, according to a preferred form of the invention, may move selectively between a small number, such as two, fixed positions. In addition, changeover "on the fly" is a relatively simple operation. In the simplest case an empty barrel is merely placed on the barrel-rotating means, displacing a full barrel so that a length of the strand extends between the top of the full barrel and the bottom of the empty barrel. Further, there is substantially no tension in the length of strand extending between the drive capstan and the take-up barrel, which minimizes strand damage and breaks.

It is possible, in certain cases, to take up a strand in a rotating barrel by merely advancing the strand downward in a straight vertical line into the barrel, so that the strand is formed into loops after contacting the surface in the barrel; however, that method has been found to result in nonuniform coverage and distribution patterns in the barrel which causes tangling and uneven withdrawal during pay out from the barrel, particularly at relatively high strand speeds. Advancement of the strand in a straight line into the barrel is not considered practical with the tinsel conductor described above in cases where the speed of advancement is greater than about 500 feet per minute; whereas, utilizing the deflectors herein proposed to form the advancing strand into a series of loops falling vertically downward at a slow speed into the barrel, strand speeds up to at least the order of 3000 feet per minute can be handled easily with relatively uniform distribution in the barrel and substantial freedom from tangling during pay out from the barrel.

An object of the present invention is to form a continuously advancing indefinite length of strand material into a series of loops.

A further object of the invention is to provide apparatus for forming a continuously advancing indefinite length of strand material into a series of loops and directing the loops of strand into a container.

Another object of the invention is to provide apparatus for forming a continuously advancing indefinite length of strand material into a series of loops and directing the strand in the form of loops into a rotatable take-up barrel.

A more specific object of the invention is to form a flexible and somewhat resilient strand, advancing at speeds of the order of at least 3000 feet per minute, into a series of uniform loops and directing the series of loops into a rotating take-up barrel, so that the collected strand may later be withdrawn from the barrel at the same order of speed without tangling.

An apparatus for forming a continuously advancing indefinite length of strand material into a series of loops, illustrating certain features of the invention, may include means for advancing the strand at a relatively high rate of speed in a path in space having a horizontal component, and a substantially vertical strand deflector positioned in the path of the advancing strand and designed to preform the strand into a series of loops and to direct the series of preformed loops of strand downwardly so that the loops fall along a substantially vertical line. The deflector has a concavely curved vertically extending surface which faces substantially in the direction of advancement of the strand entering the deflector. The deflector has a vertical flat or convexly curved strand-impinging surface against which the strand is directed in its initial impact with the deflector. The strand-impinging surface faces the concavely curved surface and projects transversely of the path of travel of the strand from a line of convergence with one side of the concavely curved surface and beyond the opposite side of the concavely curved surface and is disposed with respect to the advancing strand so that the strand makes initial contact with the portion of the strand-impinging surface projecting outwardly beyond the concavely curved portion. The strand strikes the strand-impinging surface of the deflector, is deflected by the strand-impinging surface to form a series of loops which expand in size and move outwardly against an adjacent portion of the concavely curved surface of the deflector and toward the line of convergence of the concave and strand-impinging surfaces of the deflector as the series of loops descend vertically downwardly.

Means may be provided for moving the deflector transversely with respect to a rotational axis of a receiver to change the line of the distribution of the strand into the receiver. With this arrangement, means are provided, operable upon each change of position of the deflector, for controlling the receiver-rotating means so that the linear speed of the point in the receiver, directly below the line of distribution of the strand, is substantially the same at each transverse position of the deflector.

A deflector embodying certain features of the present invention may be generally spiral in shape and have a flat or convexly curved portion positioned in the path of the advancing strand to the deflector against which the strand is directed in the initial impact with the deflector. The deflector is designed to deflect the strand downwardly in a series of loops falling along a substantially vertical line into a rotating receiver mounted therebelow.

In another embodiment of the deflector, the flat or convexly curved portion of the generally spirally shaped deflector is mounted relatively movable with respect to the remaining portion of the deflector and the curvature of the plate may be adjusted to accommodate strands of varying degrees of flexibility, resiliency or other physical properties.

Other objects and features of the present invention will be more readily understood from the following detailed description of specific embodiments thereof, when read in conjunction with the appended drawings, in which.

Figure 1:
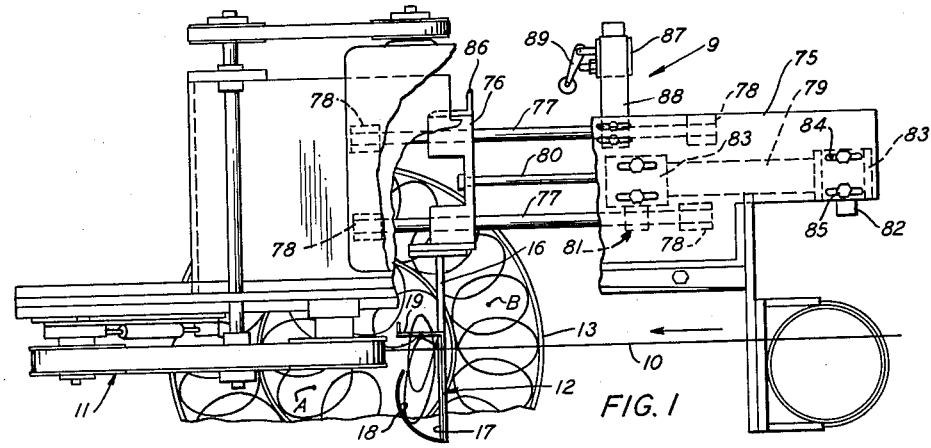
FIG. 1 is a fragmentary, top plan view of an apparatus illustrating a first embodiment of the invention, with portions of supporting structure being broken away to reveal structural details.

Referring now in detail to the drawings, and more in particular to FIGS. 1, 2, 3 and 4, a preferred embodiment of a take-up apparatus, designated generally by the numeral 9, is shown for taking up a strand 10. The strand 10 must be of a type which is capable of being formed into loops when advanced into engagement with one of the deflectors forming a part of the invention and to be described in detail hereinafter. Preferably, the strand 10 is flexible in nature, such as a tinsel conductor for telephone cordage. The strand 10 is supplied continuously from a strand-processing apparatus, such as a plastics extruder (not shown). The apparatus 9 and the controls forming a part of the apparatus are substantially identical to those disclosed in a copending application, Serial No. 74,324, filed June 11, 1958, in the name of S. M. Martin, which issued September 4, 1962, as Patent 3,052,010, except for the structural detail of the deflector and the barrel and method in which the strand is distributed into the barrel.

Means are provided, such as conventional belt-type capstan, designated generally by the numeral 11, to advance the strand 10 from the strand-processing apparatus and direct the strand into engagement with a deflector, designated generally by the numeral 12, which operates to form the advancing strand into a series of loops and causes the series of loops to fall along a substantially vertical line into a container mounted therebelow, such as a rotating take-up barrel 13. To minimize friction during take up and subsequent pay out, the strand 10 may be lubricated as it advances to the capstan 11.

The deflector 12 is movable, in a manner to be discussed in detail hereinafter, between an inner position illustrated in solid lines in FIG. 2, wherein the center line of the descending strand loops is indicated by the letter "A," and an outer position depicted in phantom lines in FIG. 2, wherein the deflector is designated by the numeral 12', the strand being deflected thereby is designated by the numeral 10', and the center line of the descending strand loops is indicated by the letter "B." The deflector, generically represented by the numeral 12, may have variant configurations, and will be described in detail hereinafter.

*Preferred Embodiment*

The deflector 12 is mounted on a bracket member, designated generally by the numeral 16 above the barrel 13 so that an inner strand-impinging surface 17, formed by a flat sheet of cellulose acetate material, is disposed in the path of the strand 10 leaving the capstan 11. The bracket 16 is preferably mounted so that the strand-impinging surface 17 is substantially vertical, but may be canted slightly to facilitate the descension of the strand loops in a substantially vertical line. The deflector has a portion having a concavely curved, vertically extending surface which faces toward the strand-impinging surface 17 substantially in the direction of advancement of the strand 10 entering the deflector 12. The strand-impinging surface 17, formed by the sheet of cellulose acetate material, projects transversely of the path of travel of the strand 10 outwardly beyond the portion of the deflector 12 forming the concavely curved surface 18 to a substantially flat vertical side portion 19.

Successive portions of the strand 10 are directed in a path in space by the capstan 11 at relatively high rate of speed toward the deflector 12 at an angle $\theta$ (FIG. 2) below the horizontal. The angle $\theta$ should be in the range of about 10° to 20° and, in the embodiment illustrated, this angle is set equal to about 15°. The capstan 11 should permit adjustment of the angle $\theta$ for various conditions in order to assure vertical descension of the strand loops. The optimum setting for the angle $\theta$ is governed by the type of strand, the speed of advancement thereof, the distance between the capstan 11 and the deflector 12, and the inclination, if any of the deflector 12.

Figure 3:
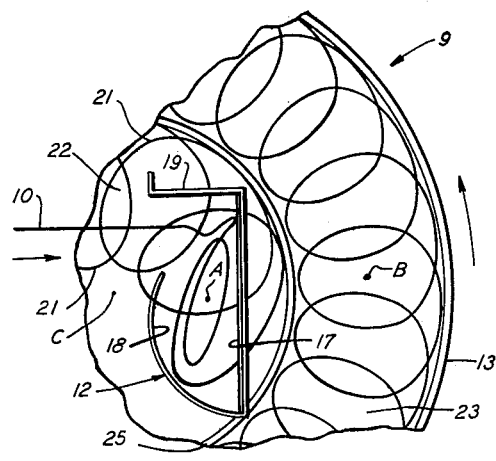
FIG. 3 is a fragmentary horizontal, sectional view of a portion of the apparatus of FIG. 2, taken generally along the line 3—3 thereof and showing the strand partially distributed in a receiver.

The strand 10 enters the deflector 12 in a plane substantially parallel to the substantially flat, vertical portion 19 projecting from the surface 17 toward the strand-advancing capstan 11 and impinges initially against the inner surface 17 of the deflector 12. The strand is bounced off the surface 17 against the adjacent spaced portion of the concavely curved surface 18 and thereby formed into a succession of loops 21—21, which descend along the substanially vertical line "A" into the rotating take-up barrel 13 for collection therein as illustrated in FIG. 3. A similar result is obtained when the reflector 12 occupies its alternative position 12' and the strand 10 is descending in a similar series of the loops 21—21 along the second, substantially vertical line "B."

The alternative, parallel lines of descension "A" and

Figure 2:
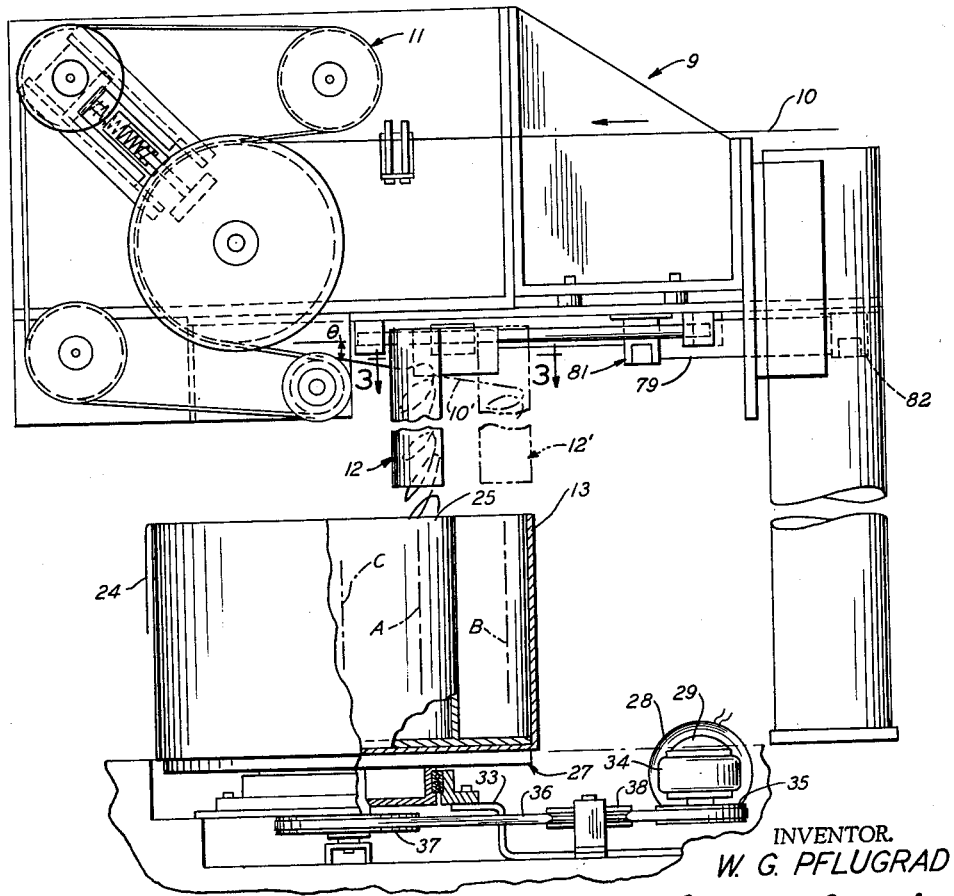
FIG. 2 is a fragmentary front view, partially in section, of the apparatus illustrated in FIG. 1, showing means for rotating a strand receiver.

"B" are so located with respect to the axis of rotation "C" of the barrel 13 that the inner line "A" is located a distance equal to approximately one-quarter of the radius of the barrel 13 from the axis of rotation "C" and the outer line "B" is approximately three-quarters of the radius of the barrel from the axis of rotation "C" as seen in FIGS. 2 and 3.

The barrel 13 is rotated slowly, in a counterclockwise direction as viewed in FIG. 3, so that the descending loops 21—21 are collected therein. Assuming that the deflector 12 occupies the inner position, the strand 10 will be collected as the barrel 13 rotates, in an inner band 22 of the loops 21—21 occupying a generally circular area having a diameter equal to approximately one-half of the diameter of the barrel 13. This is the distributing position illustrated in FIG. 3, wherein the motion has been arrested at a point where approximately one-half of the inner band 22 has been collected.

When the deflector 12 occupies the outer position, so that the strand loops 21—21 descend along the line "B," an outer band 23 of the loops 21—21 is collected in a similar manner. The band 23 occupies an outer, annular area of the bottom of the barrel 13, the width of the annular band 23 being equal to substantially half of the radius of the barrel 13. The adjacent bands 22 and 23 are formed so that they are contiguous to a divider 25, placed in the barrel or formed integrally therein, so that the bands occupy substantially the entire area of the bottom of the barrel 13.

Means are provided, such as an air-cylinder system to be described hereinafter, for indexing the deflector between the inner position 12 and the outer position 12' when the other section of the barrel 13 is filled with the desired length of the strand 10. Thus, the strand 10 is distributed in a succession of the bands 22 or 23, until each section of the barrel 13 has been filled to a desired depth with the strand 10.

When the barrel 13 has been filled, it may be replaced with an empty barrel and the take-up operation repeated. Change-over may be accomplished simply and easily by merely pushing the full barrel 13 out from under the deflector 12 and inserting an empty barrel thereunder. When this is done, a crossover length of the strand 10 will extend between the top of the full barrel 13 and the bottom of the empty barrel. This crossover length may be severed and then the full barrel 13 is ready for transportation to a subsequent strand-processing operation. A portion of the crossover length associated with the barrel 13 is designated in FIGS. 2 and 4 by the numeral 24.

Referring again to FIGS. 1 and 2, it is preferable to control the rotational speed of the barrel 13 so that the linear speed of the point in the barrel directly below the line of distribution ("A" or "B") of the strand 10 is substantially the same at each transverse position (12 or 12') of the deflector 12. This control is desired in order to assure the distribution of substantially the same amount of the strand 10 per unit circumferential length of both of the bands 22 and 23 so as to provide for even distribution of the strand 10 in the barrel 13. The exact magnitude of this linear speed is not critical since the rotating barrel 13 serves primarily as a collector for the preformed, descending loops 21—21. The magnitude of this linear speed will determine, in combination with the linear speed of the strand, the number of the loops 21—21 collected per unit circumferential length of the bands 22 and 23.

The barrel 13 may be rotated by any suitable drive means capable of rotating the barrel 13 selectively at the two predetermined speeds. A preferred arrangement is illustrated in FIG. 2 and includes generally a turntable 27 upon which the barrel 13 is placed for rotation therewith, an induction motor 28 for driving the turntable 27, and an eddy-current clutch 29, such as an "Adjusto-Spede" clutch manufactured by the Dynamatic Division of the Eaton Mfg. Co., Kenosha, Wisconsin which operates to rotate the turntable 27 at variable speeds depending upon the degree of energization thereof.

The turntable 27 is supported for rotation on a recessed platform 33, which is preferably mounted so that the top of the turntable 27 is substantially at floor level in order to facilitate loading and unloading of the barrels. The motor 28 is connected through the eddy-current clutch 29 as an input to a gear box 34, containing suitable speed-reducing gears, and a driving pulley 35 is driven from the output of the gear box 34. A V-belt 36 is passed around the driving pulley 35, a pulley 37 for rotating the turntable 27, and against a belt-tightener pulley 38.

The bracket 16, including the deflector 12, is secured at its rearward extremity (FIG. 1) to a reciprocable carriage, designated generally by the numeral 76. The carriage 76 is mounted for sliding movement between the right and left, as viewed in FIGS. 1 and 2, along a pair of guide rods 77—77. Each of the guide rods 77—77 is mounted between a pair of supporting blocks 78—78, which are secured to the under side of a platform 75.

An air cylinder, designated generally by the numeral 79, is provided, having a piston rod 80 which is attached to the right side of the carriage 76, as viewed in FIGS. 1 and 2. A first solenoid valve 81 is provided. The valve 81 is designed, at certain intervals, for applying compressed air to the left end (FIGS. 1 and 2) of the air cylinder 79 to induce retraction of the piston rod 80 from left to right into the air cylinder 79 in order to index the deflector 12 from the solid-line position 12 to the phantom-line position 12'. A second solenoid valve 82, which is similar to the valve 81 but is opposite in action, is also provided, designed at other intervals, to apply compressed air to the right end of the air cylinder 79 to drive the piston rod 80 a predetermined distance from the cylinder 79, in order to index the deflector 12 from the outer position 12' back to the inner position 12.

The air cylinder 79 is mounted between a pair of supporting blocks 83—83, which are mounted adjustably to the underside of the platform 75. As seen in FIG. 1, the platform 75 is formed with a pair of elongated slots 84—84 designed to receive bolts 85—85, which may be tightened to secure the blocks 83—83 to the platform 75 but which may be loosened to permit right-to-left adjustment of the cylinder 79 and thus of the carriage 76 and the deflector 12. The position of the blocks 83—83 determines the outer position 12' of the deflector, and the inner position 12 is set by adjusting the stroke of the piston rod 80 in a conventional fashion.

As illustrated in FIG. 1, a switch actuator 86 is secured to the carriage 76 and is designed to operate or allow operation of a switch, designated generally by the numeral 87, to either of two operating positions depending on the position of the carriage 76 and thus of the deflector 12. The switch 87 forms a part of the control circuit (not shown) and is designed to control the state of energization of the eddy-current clutch 29, associated with the turntable-rotating motor 28, in order to regulate the rotational speed of the barrel 13 in accordance with the position of the deflector 12.

The switch 87 is mounted to the under side of a plate 88, which, in turn, is mounted adjustably to the under side of the platform 75, the platform being slotted to permit adjustable mounting in the same manner that the air-cylinder supporting blocks 83—83 are mounted. The switch 87 includes a spring-loaded operating arm 89, which is normally biased to the left, as illustrated in FIG. 1, to control the energization of the clutch 29 so as to rotate the turntable 27 at its higher speed, but which is contacted and depressed by the actuator 86, as the deflector nears the outer position 12', to decrease the energization of the clutch 29 so as to rotate the turntable 27 at its lower speed. The position of the mounting plate 88 is adjusted to locate the operating arm 89 of the switch 87, in accordance with the position of the air cylinder 79, and thus the outer position of the actuator 86.

Operation of Preferred Embodiment

In order to start the take-up operation, the capstan is started so that the strand 10 from the previous operation is advanced thereby and is discharged into space toward the deflector 12. The advancing strand 10 impinges against the deflector 12 forming loops 21—21 in the process and slows down so that the successive loops 21—21 descend relatively slowly into the barrel 13.

The barrel 13 is rotated by the motor 28 through the eddy-current clutch 29, the gear box 34, and the pulleys 35 and 37, alternately, at its two relatively slow speeds so as to collect the descending strand loops 21—21. Assuming that the deflector 12 starts at its outer position 12′, the barrel 13 is rotated at its lower speed to collect a series of outer bands 23—23 of the strand loops 21—21, as illustrated in FIG. 3.

When the outer section of the barrel 13 has been filled with the desired amount of strand 10 the valve 82 is actuated either automatically or manually to supply compressed air to the right side of the air cylinder 79 so as to index the deflector 12 from the outer position 12′ to the inner position 12.

Substantially simultaneously with the indexing movement of the deflector 12, the switch actuator 86 moves from right to left as viewed in FIG. 1, which movement allows the switch 87 to open in order to connect a potentiometer in the circuit with the eddy-current clutch 29 so as to rotate the barrel 13 at the rotational speed required for the distribution of the inner band 22 of the strand loops 21—21. This speed is approximately three times the former speed of the barrel 13, so that the linear speed at the inner position is substantially equal to the former linear speed.

The barrel 13 continues to rotate at the increased rotational speed and the strand is distributed in series of the inner bands 22—22, which contains overlapping loops 21—21 of substantially the same size and number per unit circumferential length as in the outer band 23. Since the circumferential path of the point in the barrel 13 below the inner line of distribution "A" is only approximately one-third that of the point below the outer line "B," the total strand accumulated in the inner band 22 is approximately one-third that accumulated in the outer band 23.

An Alternative Embodiment

Figure 5:
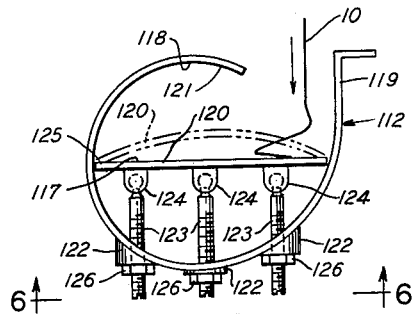
FIG. 5 is a horizontal view of a deflector constituting an alternative embodiment of the invention, looking generally along a portion of the same line as FIG. 3.
Figure 6:
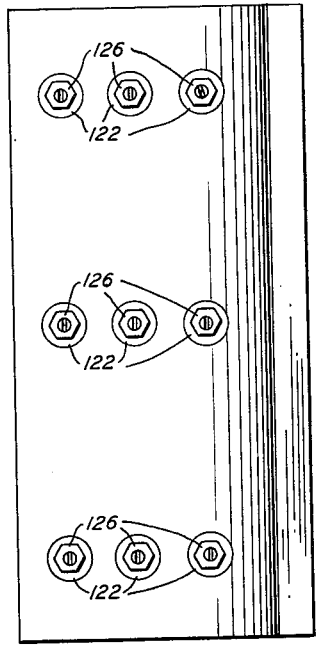
FIG. 6 is an elevational view of the deflector illustrated in FIG. 5, taken along the line 6—6 of FIG. 5.
Figure 4:
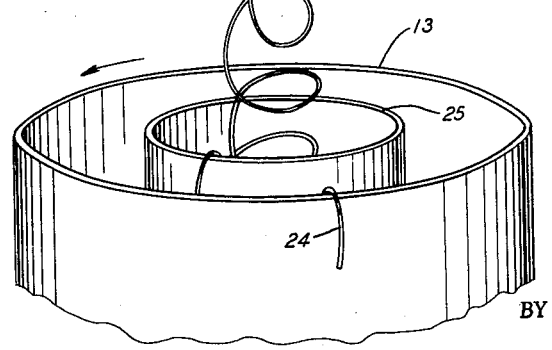
FIG. 4 is a perspective view of a portion of the apparatus illustrated in FIG. 1.

An alternative embodiment of the deflector is illustrated in FIGS. 5 and 6, the alternative embodiment also making use of substantially the same apparatus as in the preferred embodiment, with the exception of the construction of the deflector designated earlier and generically by the numeral 12.

According to the alternative embodiment of the invention, a spiral deflector, designated generally by the numeral 112, is provided. The deflector 112 is designed to receive an advancing strand 10, preferably a tinsel conductor of the type described above and in application Serial No. 810,686, filed May 4, 1959 in the name of H. L. Wessel, which issued May 29, 1962, as Patent 3,037,068, which conductor is insulated with a nominal wall thickness of 0.008 inch of Geon 6461 polyvinyl chloride insulation manufactured by B. F. Goodrich Chemical Co., deflect the strand 10, and direct the strand downwardly in a series of loops falling substantially vertically into the rotating barrel-type container (not shown).

The main body of the deflector 112 is substantially spirally shaped and is mounted above the receiver in the path of advancement of the strand 10. The deflector 112 has a portion having a concavely curved, vertically extending surface 118 which faces substantially in the direction of advancement of the strand 10 entering the deflector 112, and an adjustable, vertically extending element 120 having a flat or convex surface 117 which faces the concavely curved surface 118 and projects transversely outwardly beyond the portion 121 of the deflector 112 forming the concavely curved surface 118 to a substantially flat, vertical side portion 119. The element 120, having the flat or convex surface 117, is mounted adjustably with respect to the concavely curved surface 118 by a plurality of cooperating internally threaded members 122—122 secured to the deflector 112 and externally threaded members 123—123 secured to the member 120 by ball and socket arrangements 124—124. The substantially flat, vertical side portion 119 projects from the flat or convex surface 117 in a plane substantially parallel to the advancing strand 10. The concavely curved surface 118 and flat or convexly curved surface 117 of the deflector 112 converge at a line 125.

A belt-driven capstan is operative, in the manner discussed previously, to direct the strand 10 at an angle $\theta$ of between 10° and 20° toward the deflector 112. The deflector 112 is effective to slow down the advancing strand 10 and form the strand in a series of loops so as to facilitate distribution of the strand 10, advancing at relatively high rates of speed, into a container. The size of the loops formed in the strand 10 can be controlled by varying the speed of advancement of the strand 10 by the capstan.

Successive portions of the strand 10 are directed by the capstan at a relatively high, variable, rate of speed in a path in space and enter the deflector 112 between the relatively flat portion 119 and the concavely curved portion 118 and strike the flat or convex surface 117 of the deflector 112. The strand 10 is deflected by the flat or convex surface 117 to form a series of loops which are directed either against the flat side portion 119 and then against an adjacent and spaced portion of the concavely curved surface 118 of the deflector 112, or directly to the adjacent portion of the concave surface as the series of loops expand in size, move toward the line of convergence 125 of the flat or convex surface 117 and concave surface 118 and fall vertically downwardly toward a container.

By loosening lock nuts 126—126, turning the externally threaded members 123—123 in the internally threaded members 122—122, the curvature of the surface 117 and the spacing between the surfaces 117 and 118 can be adjusted to accommodate strands 10—10 having various degrees of flexibility, resiliency, or other physical properties.

The working surface of the deflector 112 is preferably lined with a relatively friction-free material, such as cellulose acetate or Teflon.

It is to be understood that the above-described arrangements are simply illustrative of the invention. Other arrangements may be devised by those skilled in the art which will embody the principles of the invention and fall within the spirit and scope thereof.

What is claimed is:

1. Apparatus for forming a continuously advancing indefinite length of strand material into a series of loops, which comprises:

means for advancing the strand at a relatively high rate of speed in a path in space having a horizontal component; and a substantially vertical strand deflector positioned in the path of the advancing strand designed to preform the strand into a series of loops and to direct the series of preformed loops of strand downwardly so that said loops fall along a substantially vertical line, the deflector having a concavely curved vertically extending surface which faces substantially in the direction of advancement of the strand entering the deflector, the deflector having a a vertical strand-impinging surface facing the concavely curved surface and projecting transversely of the path of travel of the strand from a line of convergence with the concavely curved surface to extend beyond the concavely curved surface and being disposed with respect to the advancing strand so that the strand enters the deflector adjacent to the concavely curved portion, strikes the strand-impinging surface of the deflector, is deflected by the strand-impinging surface to form a series of loops which increase in size and move outwardly against an adjacent portion of the concavely curved surface of the deflector and toward the line of convergence of the concave and strand-impinging surfaces of the deflector as the series of loops descend vertically downwardly.

2. Apparatus for forming a continuously advancing indefinite length of strand material into a series of loops descending into a receiver, which comprises:

a receiver;

means for advancing the strand at a relatively high rate of speed in a path in space having a horizontal component; and a substantially vertical strand deflector positioned in the path of the advancing strand at a higher elevation than the strand receiver and designed to preform the strand into a series of loops and to direct the series of preformed loops of strand downwardly so that said loops fall along a substantially vertical line into the receiver, the deflector having a concavely curved vertically extending surface which faces substantially in the direction of advancement of the strand entering the deflector, the deflector having a vertical strand-impinging surface facing the concavely curved surface and projecting transversely of the path of travel of the strand from a line of convergence with the concavely curved surface to extend beyond the concavely curved surface and being disposed with respect to the advancing strand so that the strand enters the deflector adjacent to the concavely curved portion, strikes the strand-impinging surface of the deflector, is deflected by the strand-impinging surface to form a series of loops which increase in size and move outwardly against an adjacent portion of the concavely curved surface of the deflector and toward the line of convergence of the concave and strand-impinging surfaces of the deflector as the series of loops descend downwardly along a substantially vertical line into the receiver.

3. Apparatus for distributing a strand into a rotatable open-topped receiver, which comprises:

a rotatable receiver;

means for rotating the receiver;

means for advancing the strand at a relatively high rate of speed in a path in space having a horizontal component; and a substantially vertical strand deflector positioned in the path of the advancing strand at a higher elevation than the strand receiver and designed to preform the strand into a series of loops and to direct the series of preformed loops of strand downwardly so that said loops fall along a substantially vertical line into the rotating receiver, the deflector having a concavely curved vertically extending surface which faces substantially in the direction of advancement of the strand entering the deflector, the deflector having a convexly curved, vertical strand-impinging surface facing the concavely curved surface and projecting transversely of the path of travel of the strand from a line of convergence with the concavely curved surface to extend beyond the concavely curved surface and being disposed with respect to the advancing strand so that the strand enters the deflector adjacent to the concavely curved portion, strikes the convex strand-impinging surface of the deflector, is deflected by the convex strand-impinging surface to form a series of loops which increase in size and move outwardly against an adjacent portion of the concavely curved surface of the deflector and toward the line of convergence of the concave and convex strand-impinging surfaces of the deflector as the series of loops descend downwardly along a substantially vertical line into the rotating receiver, the number of loops per unit length of strand being substantially independent of the rotary movement of the strand receiver.

4. Apparatus for distributing a strand into a rotatable open-topped receiver, which comprises:

a rotatable receiver;

means for rotating the receiver;

means for advancing the strand at a relatively high rate of speed in a path in space having a horizontal component; and a substantially vertical strand deflector positioned in the path of the advancing strand at a higher elevation than the strand receiver and designed to preform the strand into a series of loops and to direct the series of preformed loops of strand downwardly so that said loops fall along a substantially vertical line into the rotating receiver, the deflector having a concavely curved vertically extending surface which faces substantially in the direction of advancement of the strand entering the deflector, the deflector having a relatively flat, vertical strand-impinging surface facing the concavely curved surface and projecting transversely of the path of travel of the strand from a line of convergence with the concavely curved surface to extend beyond the concavely curved surface and being disposed with respect to the advancing strand so that the strand enters the deflector adjacent to the concavely curved portion, strikes the flat strand-impinging surface of the deflector, is deflected by the flat strand-impinging surface to form a series of loops which increase in size and move outwardly against an adjacent portion of the concavely curved surface of the deflector and toward the line of convergence of the concave and strand-impinging surfaces of the deflector as the series of loops descend downwardly along a substantially vertical line into the rotating receiver, the number of loops per unit length of strand being substantially independent of the rotary movement of the strand receiver.

5. Apparatus for forming a continuously advancing indefinite length of strand material into a series of descending loops, which comprises:

means for advancing the strand at a relatively high rate of speed in a path in space having a horizontal component;

a strand deflector having a substantially spiral cross section positioned in the path of advancement of the strand and designed to preform the strand into a series of loops and to direct the series of preformed loops of strand downwardly so that said loops fall along a substantially vertical line, the deflector having a concavely curved surface facing substantially in the direction of advancement of the strand entering the deflector; and an adjustable strand-impinging element having a vertical surface facing the concavely curved surface of the spiral deflector, the strand-impinging element projecting transversely of the path of travel of the strand from a line of convergence with the concavely curved surface to extend beyond the concavely curved surface of the spiral deflector, the deflector being disposed with respect to the advancing strand so that the strand enters the deflector adjacent to the concavely curved portion of the deflector, strikes the strand-impinging element, is deflected by the strand-impinging element to form a series of loops which increase in size and move outwardly against an adjacent portion of the concavely curved surface of the deflector and toward the convergence of the concave surface of the deflector and the strand-impinging element as the series of loops descend vertically downwardly.

6. Apparatus for forming a continuously advancing indefinite length of strand into a series of loops in a receiver, which comprises:
 a receiver;
 means for advancing the strand at a relatively high rate of speed in a path in space having a horizontal component;
 a strand deflector having a substantially spiral cross section positioned in the path of advancement of the strand at a higher elevation than the strand receiver and designed to preform the strand into a series of loops and to direct the series of preformed loops of strand downwardly so that said loops fall along a substantially vertical line into the rotating receiver, the deflector having a concavely curved surface facing substantially in the direction of advancement of the strand entering the deflector; and
 an adjustable strand-impinging element having a vertical surface facing the concavely curved surface of the spiral deflector, the strand-impinging element projecting transversely of the path of travel of the strand from a line of convergence with the concavely curved surface to extend beyond the concavely curved surface of the spiral deflector, the deflector being disposed with respect to the advancing strand so that the strand enters the deflector adjacent to the concavely curved portion of the deflector, strikes the strand-impinging element, is deflected by the strand-impinging element to form a series of loops which increase in size and move outwardly against an adjacent portion of the concavely curved surface of the deflector and toward the convergence of the concave surface of the deflector and strand-impinging element as the series of loops descend downwardly along a substantially vertical line into the receiver.

7. Apparatus for distributing a strand into a rotatable open-topped receiver, which comprises:
 a rotatable receiver;
 means for rotating the receiver;
 means for advancing the strand at a relatively high rate of speed in a path in space having a horizontal component;
 a strand deflector having a substantially spiral cross section positioned in the path of advancement of the strand at a higher elevation than the strand receiver and designed to preform the strand into a series of loops and to direct the series of preformed loops of a strand downwardly so that said loops fall along a substantially vertical line into the rotating receiver, the deflector having a concavely curved surface facing substantially in the direction of advancement of the strand entering the deflector;
 a relatively flat adjustable strand-impinging element having a vertical surface facing concavely curved surface of the spiral deflector, the strand-impinging element projecting transversely of the path of travel of the strand from a line of convergence with the concavely curved surface to extend beyond the concavely curved surface of the spiral deflector, the deflector being disposed with respect to the advancing strand so that the strand enters the deflector adjacent to the concavely curved portion of the deflector, strikes the strand-impinging element, is deflected by the strand-impinging element to form a series of loops which increase in size and move outwardly against an adjacent portion of the concavely curved surface of the deflector and toward the convergence of the concave surface of the deflector and strand-impinging element as the series of loops descend downwardly along a substantially vertical line into the rotating receiver, the number of loops per unit length of strand being substantially independent of the rotary movement of the strand receiver; and
 means for adjusting the distance between the strand-impinging element and the concavely curved surface of the deflector.

8. Apparatus for distributing a strand into a rotatable open-topped receiver, which comprises:
 a rotatable receiver;
 means for rotating the receiver;
 means for advancing the strand at a relatively high rate of speed in a path in space having a horizontal component;
 a strand deflector having a substantially spiral cross section positioned in the path of movement of the strand at a higher elevation than the strand receiver and designed to preform the strand into a series of loops and to direct the series of preformed loops of strand downwardly so that said loops fall along a substantially vertical line into the rotating receiver, the deflector having a concavely curved surface facing substantially in the direction of advancement of the strand entering the deflector;
 an adjustable strand-impinging element having a convexly curved vertical surface facing the concavely curved surface of the spiral deflector, the stand-impinging element projecting transversely of the path of travel of the strand from a line of convergence with the concavely curved surface to extend beyond the concavely curved surface of the spiral deflector, the deflector being disposed with respect to the advancing strand so that the strand enters the deflector adjacent to the concavely curved portion of the deflector, strikes the convexly curved surface of the strand-impinging element, is deflected by the strand-impinging element to form a series of loops which increase and move outwardly against an adjacent portion of the concavely curved surface of the deflector and toward the convergence of the concave surface of the deflector and strand-impinging element as the series of loops descend downwardly along a substantially vertical line into the rotating receiver, the number of loops per unit length of strand being substantially independent of the rotary movement of the strand receiver; and
 means for adjusting the distance between the convexly curved surface of the strand-impinging element and the concavely curved surface of the deflector.

9. Apparatus for distributing a strand into a rotatable open-topped receiver, which comprises:
 a rotatable receiver;
 means for rotating the receiver;
 means for advancing the strand at a relatively high variable rate of speed in a path in spaced having a horizontal component;
 a strand deflector having a substantially spiral cross section positioned in the path of advancement of the strand at a higher elevation than the strand receiver and designed to preform the strand into a series of loops and to direct the series of preformed loops of strand downwardly so that said loops fall along a substantially vertical line into the rotating receiver, the deflector having a concavely curved surface facing substantially in the direction of advancement of the strand entering the deflector;
 an adjustable strand-impinging element having a convexly curved vertical surface facing the concavely curved surface of the spiral deflector, the strand-impinging element projecting transversely of the path of travel of the strand from a line of convergence with the concavely curved surface to extend beyond the concavely curved surface to a relatively flat vertical side surface of the spiral deflector, the deflector being disposed with respect to the advancing strand so that the strand enters the deflector adjacent to the concavely curved portion of the deflector, strikes the convexly curved surface of the strand-impinging element, is deflected by the strand-impinging element to form a series of loops which increase in size and move outwardly against an adjacent portion of the concavely curved surface of the deflector and toward the convergence of the concave surface of the deflector and strand-impinging element as the series of loops descend downwardly along a substantially vertical line into the rotating receiver, the number of loops per unit length of strand being substantially independent of the rotary movement of the strand receiver; and means for adjusting the curvature of the convexly curved surface of the strand-impinging element and the distance between the convexly curved surface of the strand-impinging element and the concavely curved surface of the deflector.

References Cited in the file of this patent

UNITED STATES PATENTS 3,052,010     Martin ------------------ Sept. 4, 1962